(12) United States Patent
Cockayne

(10) Patent No.: US 6,173,832 B1
(45) Date of Patent: Jan. 16, 2001

(54) ASSEMBLY LINE SYSTEMS

(76) Inventor: David J Cockayne, 5 Darell Croft, Newhall, Walmley, Sutton Coldfield B76 1HU (GB)

( * ) Notice: Under 35 U.S.C. 154(b), the term of this patent shall be extended for 0 days.

(21) Appl. No.: 09/177,388

(22) Filed: Oct. 23, 1998

Related U.S. Application Data

(63) Continuation of application No. PCT/GB97/01131, filed on Apr. 24, 1997.

(30) Foreign Application Priority Data

Apr. 25, 1996 (GB) .................................................. 9608507

(51) Int. Cl.$^7$ .................................................. B65G 17/06
(52) U.S. Cl. .............................................................. 198/852
(58) Field of Search .............................................. 198/852

(56) References Cited

U.S. PATENT DOCUMENTS

| | | |
|---|---|---|
| 2,319,617 | 5/1943 | Manierre . |
| 2,619,843 * | 12/1952 | Kampfer ................................ 198/852 |
| 3,317,030 * | 5/1967 | Davis ...................................... 198/852 |
| 3,493,097 * | 2/1970 | Karr ........................................ 198/852 |
| 3,895,691 * | 7/1975 | Shiraishi ................................. 198/852 |
| 4,524,865 * | 6/1985 | Von Hofen ............................. 198/852 |
| 4,895,248 * | 1/1990 | Wahren ................................... 198/852 |
| 5,402,880 * | 4/1995 | Murphy ................................... 198/852 |
| 5,407,061 * | 4/1995 | Okada et al. ........................... 198/852 |
| 5,429,227 * | 7/1995 | Krossmann et al. ................... 198/852 |
| 5,586,644 * | 12/1996 | Coen et al. ............................. 198/852 |
| 5,803,236 * | 9/1998 | Wahren ................................... 198/852 |

FOREIGN PATENT DOCUMENTS

| | | |
|---|---|---|
| 1.095.233 | 5/1955 | (FR) . |
| 94/26636 | 11/1994 | (WO) . |

* cited by examiner

Primary Examiner—Dean J. Kramer
Assistant Examiner—Bryan Jaketic
(74) Attorney, Agent, or Firm—Pillsbury Madison & Sutro LLP

(57) ABSTRACT

The conveyor chain, shown in the figure, has links interconnected by pivot pins, each passing through legs of one link and through generally C-shaped annular portion of an adjacent link said portion being seated between the legs. The pivot pin passes through part-cylindrical core seated with annular portion. Each C-shaped portion has integral legs. Each core is integrally formed with disc element seated in a curved stepped guide recess of the adjacent link. The upper surface of each disc element is arranged in the same plane as the upper surface of the adjacent link. As the chain travels on a flat surface the upper surface of the chain is flat with disc element covering the gaps.

15 Claims, 4 Drawing Sheets

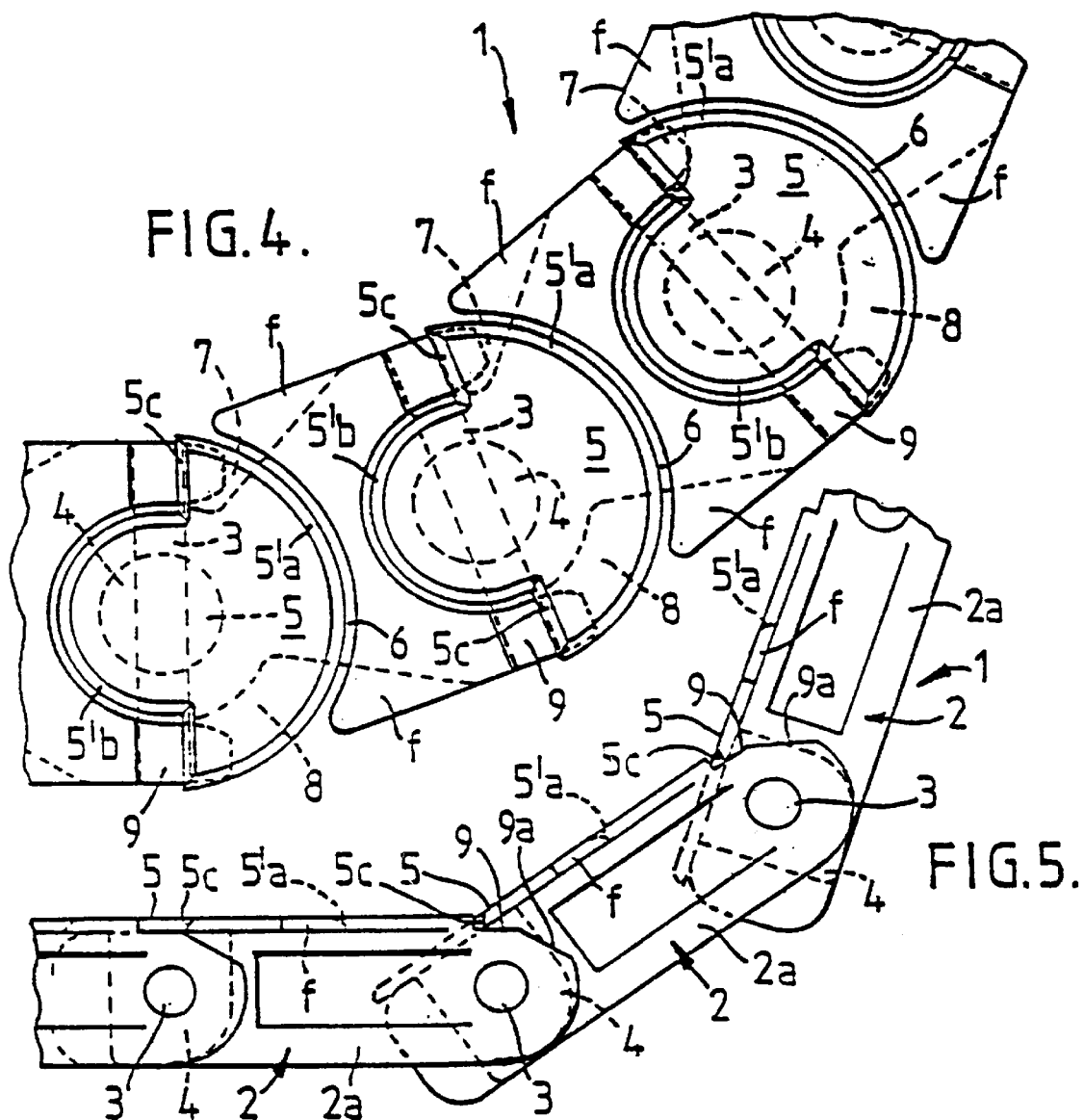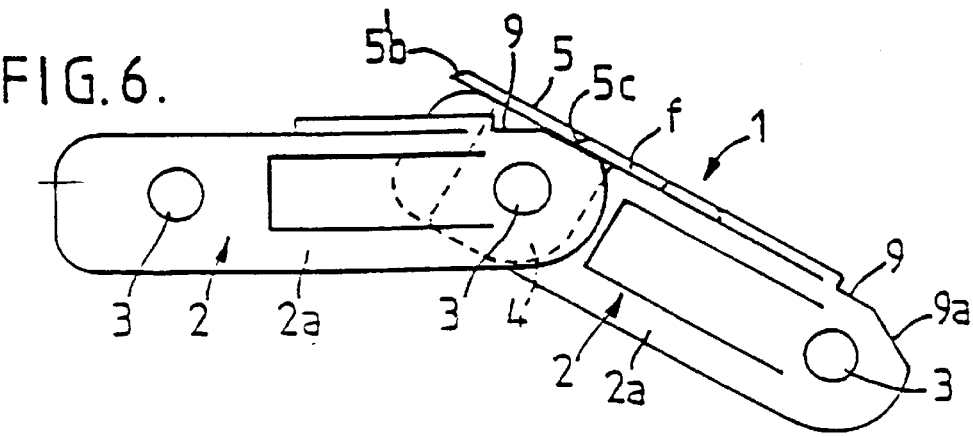

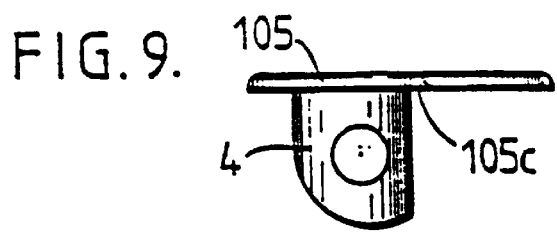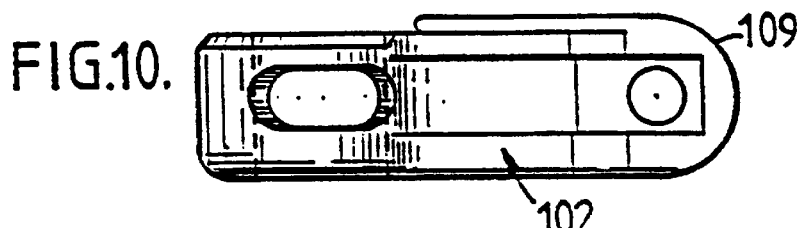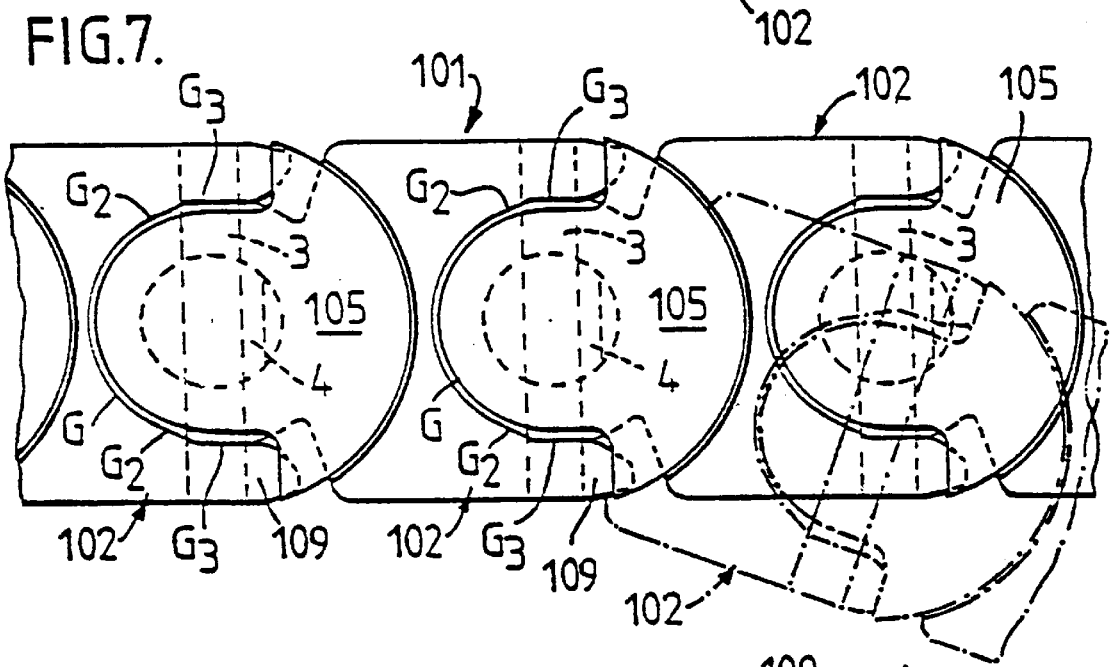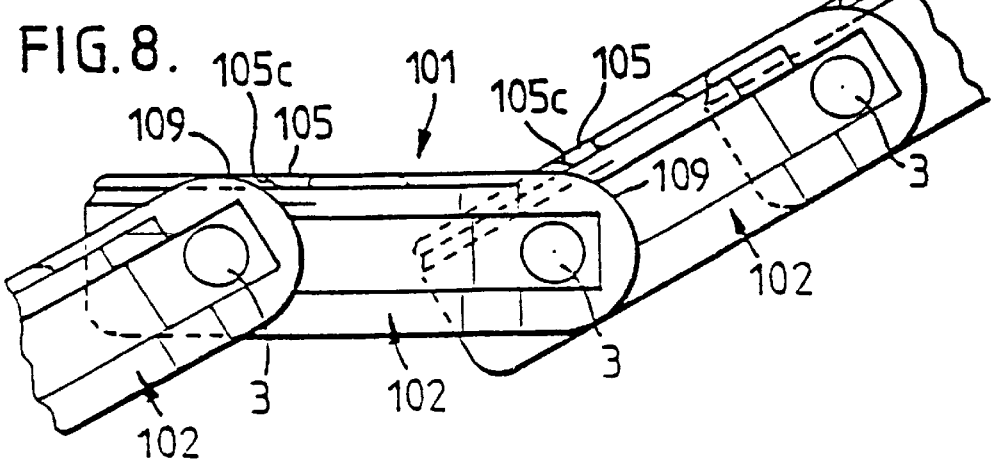

ASSEMBLY LINE SYSTEMS

This is a Continuation of International Application No. PCT/GB97/01131 filed Apr. 24, 1997 which designated the U.S.

BACKGROUND OF THE INVENTION

This invention relates to improvements in or relating to assembly line systems and is particularly concerned with conveyor chains used in such systems.

Cardanic conveyor chains are well known and may be utilised to carry pallets to various work stations along the assembly line, said pallets carrying workpieces to be operated on at the work stations.

In many known arrangements, the conveyor chains comprise chain links connected together in such manner that gaps occur in between the links on either side of the central axis of the conveyor chain, in order to allow the chain to follow a curved path in a generally horizontal plane. As the chain negotiates such a curved path the gaps on the inside of the curve tend to close whilst the gaps on the outside of the curve tend to open wider. Such gaps have been recognised as undesirable since it is possible that a finger, for example, could be trapped in such a gap and injured. Disadvantages of connecting together the links of the conveyor chain in such a manner that these gaps exist are discussed in Patent Specification No. WO 94/26636 and that Patent Specification outlines an arrangement including a disc-shaped element that covers the gaps during such relative rotation of the links in a horizontal plane. Other arrangements have been proposed for covering the gaps which include crescent fin-like projections that cover the gaps, although such proposals have been found to impose a restricted movement of the links relative to one another about a generally horizontal axis.

Whilst the arrangement shown in Patent Specification No. WO 94/26636 apparently shows an arrangement in which the movement about two mutually orthogonal axes is less restricted than some other arrangements including disc-shaped elements covering said gaps, it is believed that there still tend to be disadvantages with that arrangement.

For example, although the disc elements cover the gaps in the chain shown in WO 94/26636, the disc elements themselves are below the upper level of the chain thus creating shallow recesses an either side of the central axis of the chain which could lead to an ingress of dirt or other particulate matter. Furthermore, it is believed that the conveyor chain could be manufactured in a more efficient, simpler or cost-effective manner.

SUMMARY OF THE INVENTION

It is an object of the present invention to at least alleviate one or more of the aforementioned, or other, disadvantages associated with a conveyor chain incorporating some means to cover the gaps between the links of the chain.

According to the present invention there is provided a conveyor chain including links connected together to be rotatable relative to one another about mutually orthogonal axes, the chain having gaps in between the links to allow the chain to follow a generally curved path, in use, in a generally horizontal plane, said gaps on the inside curvature of the chain closing with the gaps on the outside of the curvature opening, said gaps being covered by plate means during rotation of the links in said generally horizontal plane, the conveyor chain being characterised in that the upper surface of the plate means is generally co-planar with the upper surface of the links and/or in that the chain is made up of units each comprising a link and plate means integrally formed with a core that is positioned within, and formed separately from, the link, said units being connected to one another by means of pivot pins that pass through said cores.

In an alternative embodiment, it is possible that said plate means is fastened to the core in overlying relationship rather than being integrally formed therewith.

Further according to the present invention there is provided an assembly line system including at least one conveyor chain in accordance with either of the immediately preceding paragraphs.

Preferably, the plate means is in the form of a disc element having a curved or part-circular head portion received in a stepped guide recess in the adjacent link thereby allowing relative rotation of two adjoining links, in use, generally in a horizontal plane. The disc element may be provided with a base portion overlying a generally C-shaped annular portion of the link receiving the core that is connected with the disc element. The head portion of the disc element may be provided with rearward chamfered straight edge boundaries adjacent front (preferably curved) upper surfaces of the associated link and said rearward edge boundaries may act to limit or restrict the degree of rotation of adjoining links relative to one another in an upward and/or downward sense of rotation.

Further according to the present invention there is provided a conveyor chain having one or more of the following features:

(a) gaps in between links of the chain on each side of the axis of the chain said links being rotatable relative to one another in a generally horizontal plane, in use, (or in the plane of the links when aligned) in order for the chain to follow a curved path in said generally horizontal plane, each link having a flat upper surface which is stepped down to provide a guide recess for a disc element that covers the gaps during relative rotation of the links in said generally horizontal plane, each said link preferably having a generally C-shaped annular portion which receives a core connected to the disc element with the disc element overlying said C-shaped annular portion, (b) links including a generally C-shaped portion receiving a core with an overlying disc element arranged to cover gaps occurring in between the links, during relative rotation of said links in a generally horizontal plane, in use, (c) links connected together with gaps occurring on each side of a central axis of the chain, said gaps being covered by disc elements during relative rotation of the links in a generally horizontal plane in use, the complete upper surface of the disc elements being visible from above the chain and presenting a substantially flat upper surface substantially co-planar with the upper surface of the links, said disc elements being received in guide recesses in the links, and (d) a series of interconnected links receiving disc elements that cover gaps in between the links during relative rotation of the links in a generally horizontal plane in use, the upper surfaces of the disc elements being substantially exposed and presenting a flat surface to the conveyor belt in conjunction with upper surfaces of the links.

Further advantageous features of the present invention will be apparent from the following description and drawings.

BRIEF DESCRIPTION OF THE DRAWINGS

An embodiment of a cardanic conveyor chain, for an assembly line system, in accordance with the present invention will now be described, by way of example only, with reference to the accompanying drawings in which:

FIG. 4 shows several chain links corresponding to FIG. 1 with the chain negotiating a curve in a generally horizontal plane;

FIG. 5 shows a side view of the chain links similar to FIG. 2 but with the chain negotiating an upward curve i.e. with links rotating about horizontal axes;

FIG. 6 shows two chain links in side elevation with one link being rotated downwardly about a horizontal axis relative to the other link;

FIG. 7 shows a modified embodiment of chain links shown in plan view in a similar manner to FIG. 1 of the drawings;

FIG. 8 shows a side view of the modified chain shown in FIG. 7 with two links rotating about horizontal axes;

FIG. 9 shows a side view of a disc element of the modified conveyor chain;

FIG. 10 shows a side view of one of the links of the modified conveyor chain;

DETAILED DESCRIPTION OF THE PREFERRED EMBODIMENTS

Figure 1:
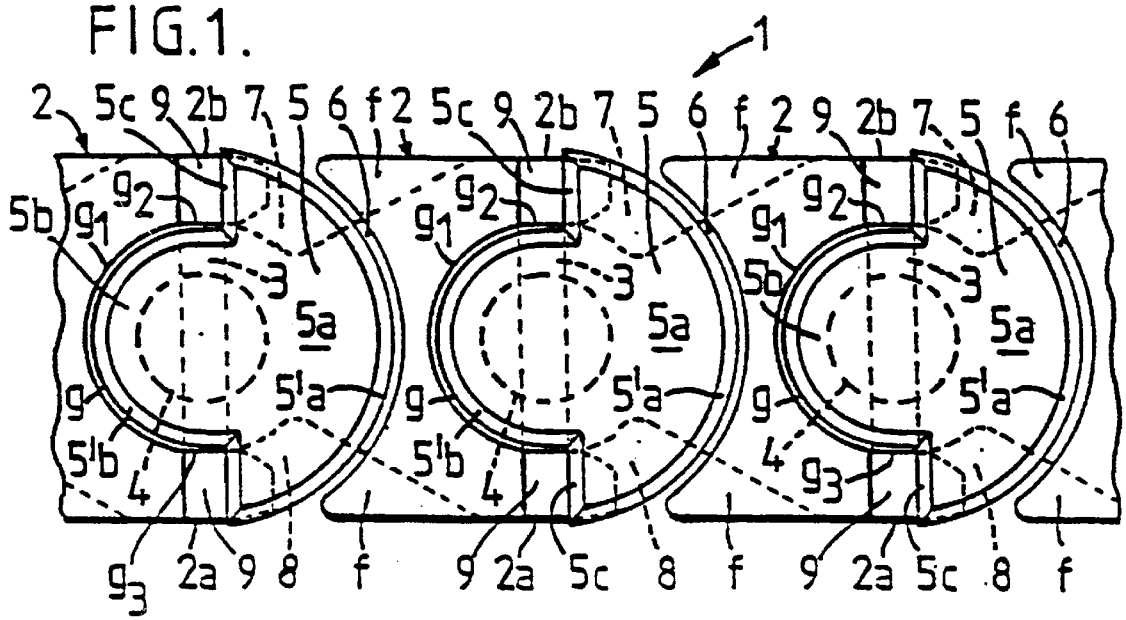
FIG. 1 shows a plan view of several links of the conveyor chain.

Referring to FIGS. 1 to 6 of the drawings, a cardanic conveyor chain 1 includes a series of links 2 interconnected by means of pivot pins 3. Each pivot pin 3 passes through straddled legs 2a and 2b of one link and through the generally C-shaped annular portion 2c of an adjacent link, said generally C-shaped annular portion being seated between said legs 2a,2b. The pivot pin 3 also passes through a part-cylindrical core 4 seated snugly within the associated generally C-shaped annular portion 2c, said core having an external diameter matching the internal diameter of the associated generally C-shaped annular portion 2c. Each generally C-shaped annular portion 2c is integrally formed with associated legs 2a and 2b, said legs having portions 2d that diverge outwardly from the generally C-shaped annular portion 2c, which portions 2d join integral spaced parallel leg portions 2e. The aforedescribed arrangement is generally known but FIGS. 1 to 8 show a new arrangement in which each care 4 is integrally formed with plate means 5 (or possibly the plate means may be fastened to the core in overlying relationship) in the general form of a disc element, said element 5 being seated in a curved stepped guide recess 6 of the adjacent link 2. The upper surface of each disc element 5 is arranged in the same plane as the upper surface of the adjacent link 2 so that, advantageously, when the conveyor chain 1 travels on a flat or horizontal surface the upper surface of the chain is substantially flat with the disc elements 5 covering the gaps 7 and 8 (see the underside view of the conveyor chain links—FIG. 3). Each link 2, associated core 4 and disc element 5 make up a unit of the chain 1 that can be connected to a similar unit by means of pivot pin 3.

As the conveyor chain 1 negotiates a curve in a generally horizontal plane (for example as shown in FIG. 4) the gaps 7 on the inner curvature of the chain conveyor close while the gaps 8 on the outer curvature of the chain open. However, each link 2 rotates in the horizontal plane relative to the disc element 5 of the adjacent link in such manner that said disc elements 5 still cover the gaps 7 and 8 as the chain negotiates a curve in the horizontal plane (or in the plane of the links when aligned).

The arrangement shown in WO 94/26636 includes disc elements which are separately formed from the associated core and said disc elements and, although covering the gaps 7 and 8 during rotation of the links in horizontal plane, do not present a flat upper surface to the conveyor chain.

Forming the disc elements 5 integrally with (or fastened to) the core and constructing the conveyor chain links to co-operate with disc elements as described provides a more cost-effective, simpler construction advantageously offering a flat upper surface unlike in the arrangements shown in WO 94/26636.

FIG. 5 shows a side view of the conveyor chain 1 in which two of the links have been rotated upwardly about horizontal axes. Each link 2 has a flat plate portion f which defines a semi-circular gap g in between itself and the associated generally C-shaped annular portion 2c of the adjoining link. The semi-circular boundary line $g_1$ on each plate portion f joins parallel straight portions $g_2$ and $g_3$ arranged on either side of the central axis of the conveyor chain as shown more particularly in FIG. 1. The shape of the gap g coupled with the straight edge boundary lines $g_2$ and $g_3$ of the link permits upward and downward swinging or rotating of adjoining links about horizontal axes provided by the pivot pins 3 in a manner which should be evident more particularly from FIGS. 5 and 6 of the drawings. FIG. 6 shows one link pivoting downwardly relative to an adjacent link.

As should be evident more particularly from FIG. 1, each element 5 has an enlarged, part-circular head portion 5a that is guided in the stepped recess 6 and a smaller base portion 5b arranged adjacent the gap g. The base portion 5b of the disc element 5 overlies the C-shaped annular portion 2c of the link receiving the core 4 attached to the base portion. Thus, the C-shaped annular portion 2c terminates at an upper level which is below the upper level of the link 2 itself. The leading curved boundary of the head portion 5a is rounded at 5'a as shown more particularly in FIG. 2 and the outer boundary of base portion 5b is also rounded at 5'b in downward direction towards boundary line $g_1$ (see FIG. 2).

Figure 2:
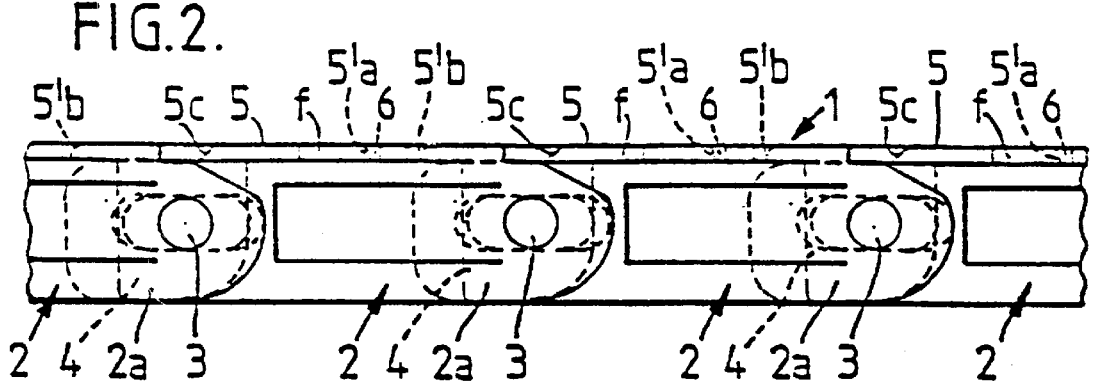
FIG. 2 shows a side view of the links shown in FIG. 1.
Figure 3:
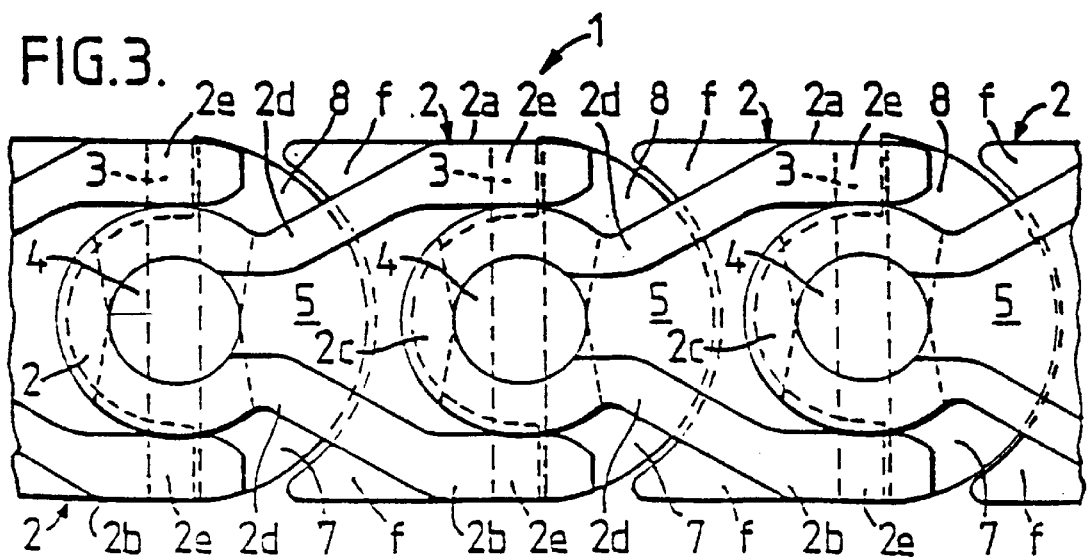
FIG. 3 shows an underneath view of the chain links shown in FIG. 1.
Figure 11:
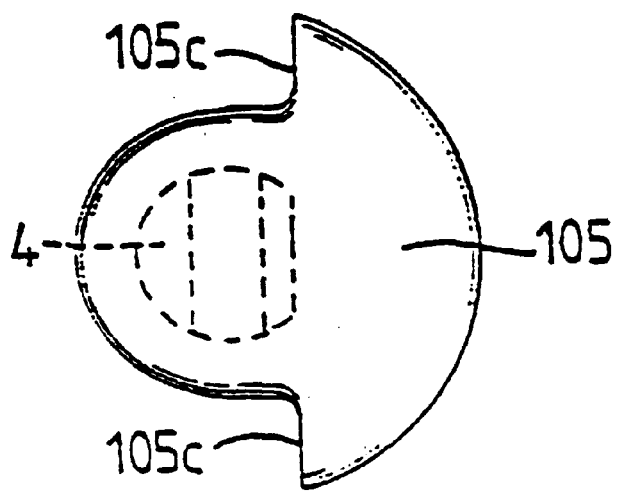
FIG. 11 shows a plan view of the disc element shown in FIG. 10.
Figure 12:
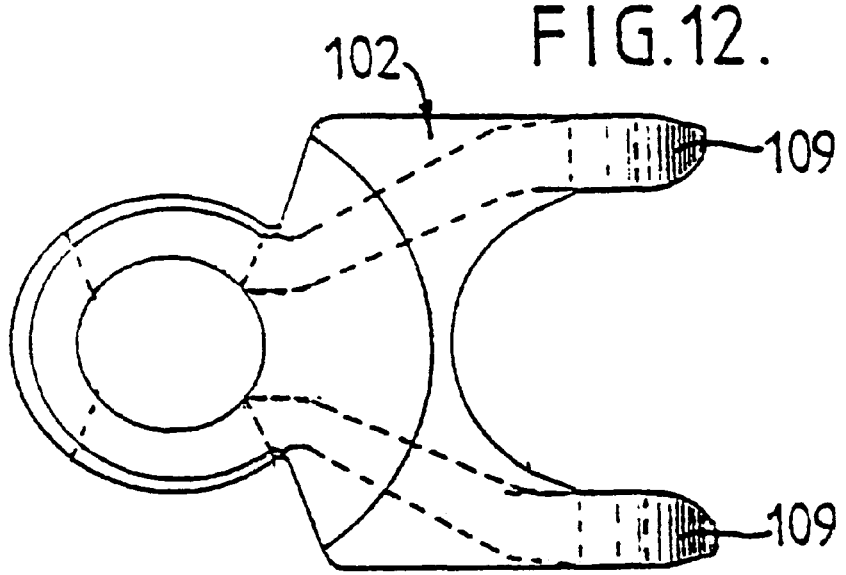
FIG. 12 shows a plan view of the link shown in FIG. 10.

Rearward straight edge boundaries 5c of the head portion 5a are chamfered at a 45° angle as shown more particularly in FIG. 2. Each link 2 has flat front stepped upper surfaces 9 adjacent the rear edge boundaries 5c of the disc element 5, said surfaces 9 joining downwardly tapered surfaces 9a (see in particular FIG. 6) at said rear edge boundaries 5c to allow a free pivoting movement of the links about horizontal axes in both an upward direction and in a downward direction (as far as is shown in FIG. 6 where the surfaces 9a contact the underside of the disc element 5). The precise shape of the disc element edge boundaries 5c and gap g can be chosen in any manner to suit a restriction or selection on the amount of upward or downward rotation of the links 2 as the case may be.

Thus, FIGS. 7 to 14 show a modified embodiment of a conveyor chain 101 in which the upward swinging movement between links 102 has been arranged to be a maximum of about 40° (see FIG. 8). The links 102 of the chain conveyor 101 are very similar to links 2 except that the semi-circular boundary line $g_1$ of the chain 1 has now been replaced by the boundary line G which is almost semi-circular but which ends in straight tapering line portions G2 meeting straight parallel boundary line portions G3. The disc element 105 is of the shape shown in FIGS. 9 and 11 and includes rearward 45° angle chamfered edges 105C which are angled in the opposite direction to the chamfered edges 5c of the chain 1. The rearward edges 105c are chamfered to allow smooth passage of the disc element 105 relative to the downwardly curved front upper surfaces 109 present on the adjacent link 102 during relative rotation of the adjoining links in a downwards direction to at least 90°, and in an upward direction through at least 40° until the edge boundaries 105c contact the upper surface of the adjoining link 102 just beyond the surfaces 109 to provide a positive stop on further upward rotation.

Figure 13:
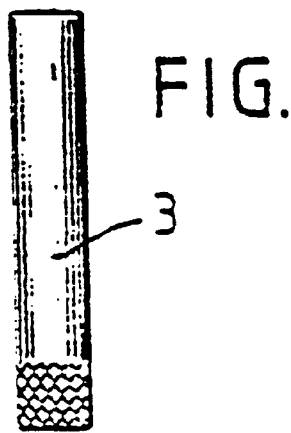
FIGS. 13 and 14 show two different pins that could be utilised to connect two links together.

FIG. 13 shows a view of one of the pins 3 utilised to fasten the links 2 together, said pin being of a generally known form with knurling at one end to hold the pin firmly in position in the links in a manner which should be obvious from the drawings.

Figure 14:
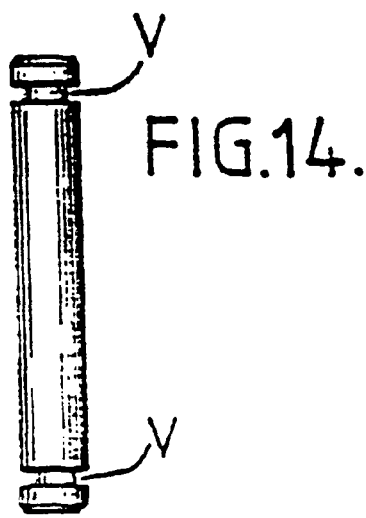

FIG. 14 shows an alternative pin (without knurling) having two snap grooves co-operable with integral raised rims on the links 102 in a manner which should readily be envisaged.

FIG. 7 shows a view of the cardanic conveyor chain 101 which is similar to the view of the chain 1 shown in FIG. 1 and additionally one of the links 102 (to the right of the FIGURE) is shown in chain dotted lines after having been rotated through an angle in a horizontal plane.

FIG. 8 shows in side elevation one link 102 horizontal with a right-hand link shown angled upwardly and a left hand link shown angled downwardly.

It is believed that the particular dimensions and co-operating arrangement of links with the disc elements is particularly advantageous and allows a selection to be made easily regarding the amount of upward or downwards movement to be allowed in the conveyor chain according to governing parameters of the assembly line system.

It is to be understood that the scope of the present invention is not to be unduly limited by the particular choice of terminology and that a specific term may be replaced by an equivalent or generic term. Further it is to be understood that individual features, method or functions relating to the conveyor chain, links or disc elements might be individually patentably inventive. The singular may include the plural and vice versa.

What is claimed is:

1. A conveyor chain comprising:
   a plurality of links;
   pivot pins connecting said links together so that said links are rotatable relative to one another about mutually orthogonal axes;
   said chain having gaps, on an inside curvature of the chain and on an outside curvature opening of the chain, in between said links to allow the chain to follow during use a generally curved path in a generally horizontal plane,
   said gaps on the inside curvature of the chain closing with the gaps on the outside curvature opening,
   plate means covering said gaps during rotation of said links in and said generally horizontal plane; and
   an upper surface said plate means being generally co-planar with an upper surface of said links;
   said chain being divided into units each comprising a said link and a said plate means with, for each unit, a respective core being one of (A) integrally formed with the respective plate means and (B) fastened to the plate means in overlying relationship, said units being connected to one another by said pivot pins, and said pivot pins passing through said cores.

2. A chain as claimed in claim 1 in which said plate means is fastened to the core in overlying relationship.

3. A chain as claimed in claim 1 or claim 2 in which the plate means is in the form of a disc element having a curved or part-circular head portion received in a stepped guide recess in the adjacent link thereby allowing relative rotation of two adjoining links, in use, generally in a horizontal plane.

4. A chain as claimed in claim 3 in which the disc element is provided with a base portion overlying a generally C-shaped annular portion of the link receiving the core that is connected with the disc element.

5. A chain as claimed in claim 3 in which the head portion of the disc element is provided with rearward chamfered straight edge boundaries adjacent front upper surfaces of the associated link.

6. A chain as claimed in claim 5 in which said front upper surfaces are curved.

7. A chain as claimed in claim 5 in which said rearward edge boundaries act to limit or restrict the degree of rotation of adjoining links relative to one another in an upward and/or downward sense of rotation.

8. A chain as claimed in claim 5 or claim 6 in which said rearward edge boundaries act to limit or restrict the degree of rotation of adjoining links relative to one another in an upward and/or downward sense of rotation.

9. A conveyor chain comprising:
   a plurality of links;
   pivot pins connecting said links together so that said links are rotatable relative to one another about mutually orthogonal axes;
   said chain having gaps, on an inside curvature of the chain and on an outside curvature opening of the chain, in between said links to allow the chain to follow during use a generally curved path in a generally horizontal plane,
   said gaps on the inside curvature of the chain closing with the gaps on the outside curvature opening,
   plate means covering said gaps during rotation of said links in said generally horizontal plane; and
   said conveyor chain further including at least one of (A) an upper surface, said plate means being generally co-planar with an upper surface of said links, and (B) said chain being divided into units each comprising a said link and a said plate means with, for each unit, a respective core being one of (C) integrally formed with the respective plate means and (D) fastened to the plate means in overlying relationship, said units being connected to one another by said pivot pins, and said pivot pins passing through said cores.

10. A chain as claimed in claim 9 in which said plate means is fastened to the core in overlying relationship.

11. A conveyor chain comprising:
    a plurality of links, there being gaps in between said links on each side of an axis of the chain;
    said links being rotatable relative to one another in one of a generally horizontal plane in use and a plane of the links when aligned, in order for the chain to follow a curved path in said generally horizontal plane,
    a disc element;
    each link having a flat upper surface which is stepped down to provide a guide recess for said disc element that covers the gaps during relative rotation of the links in said generally horizontal plane;

a core connected to said disc element;

each link having a generally C-shaped annular portion which receives said core connected to said disc element; and said disc element overlying said C-shaped annular portion.

12. A conveyor chain comprising:

a plurality of links, there being gaps occurring between the links;

a core having an overlying disc element covering said gaps during relative rotation of said links in a generally horizontal plane, in use; and a generally C-shaped portion receiving said core.

13. A conveyor chain comprising:

a plurality of links connected together with gaps on each side of a central axis of the chain, and disc elements having an upper surface and covering said gaps during relative rotation of said links in a generally horizontal plane in use;

said upper surface of said disc elements being completely visible from above the chain and presenting a substantially flat upper surface substantially co-planar with an upper surface of said links; and said disc elements being received in guide recesses in said links.

14. A conveyor chain comprising:

disc elements having upper surfaces; and a series of interconnected links having upper surfaces and receiving said disc elements which cover gaps in between the links during rotation of the links in a generally horizontal plane in use;

the upper surfaces of the disc elements being substantially exposed and presenting a flat surface to the conveyor in conjunction with said upper surfaces of said links.

15. A conveyor chain comprising:

a plurality of links, there being gaps in between the links to allow the chain to follow a generally curved path, in use, in a generally horizontal plane;

said gaps on an inside curvature of the chain closing with gaps that are on an outside of the curvature opening;

plate means covering said gaps during rotation of said links in said generally horizontal planes;

pivot pins;

said chain being made up of units, each unit being comprised of only two parts comprising a link plate means core connected together by said pivot pins.

* * * * *